(12) United States Patent
Mustaros et al.

(10) Patent No.: US 7,607,894 B2
(45) Date of Patent: Oct. 27, 2009

(54) WIND TURBINE BLADE

(75) Inventors: Pep Prats Mustaros, Barcelona (ES); Gottfried Schuon, Barcelona (ES)

(73) Assignee: Ecotecnia, s.coop.c.l., Barcelona (ES)

( * ) Notice: Subject to any disclaimer, the term of this patent is extended or adjusted under 35 U.S.C. 154(b) by 401 days.

(21) Appl. No.: 11/545,837

(22) Filed: Oct. 11, 2006

(65) Prior Publication Data
US 2007/0086897 A1   Apr. 19, 2007

(51) Int. Cl.
*F03D 11/00* (2006.01)
(52) U.S. Cl. .................................. 416/231 R; 416/232
(58) Field of Classification Search ............. 416/231 R, 416/231 B, 232, 228
See application file for complete search history.

(56) References Cited

U.S. PATENT DOCUMENTS 7,040,863 B2 * 5/2006 Guimbal ................. 416/134 A
7,150,817 B2 * 12/2006 Cho ........................... 204/660
2004/0028528 A1   2/2004 Flemming

FOREIGN PATENT DOCUMENTS

| DE | 10300284 | | 7/2004 |
|---|---|---|---|
| JP | 2005105916 A | * | 4/2005 |
| WO | WO 2004029448 | * | 4/2004 |

* cited by examiner

*Primary Examiner*—Ninh H Nguyen
(74) *Attorney, Agent, or Firm*—Shook, Hardy & Bacon LLP

(57) ABSTRACT

A wind turbine blade includes a drain comprising at least one bore formed on the surface of the blade and communicating with the interior of the blade, the bore being located at the root area. The bore is preferably from 8 mm to 15 mm wide. In blades having an internal strengthening structural member creating an enclosure, there is a bore on either side of the enclosure member. The bore is within 5 cm from the enclosure member.

15 Claims, 2 Drawing Sheets

WIND TURBINE BLADE

CROSS REFERENCE TO RELATED APPLICATIONS

This application claims priority to European Patent Application No. EP05109523.0 filed Oct. 13, 2005.

BACKGROUND OF THE INVENTION

A wind turbine is provided with a rotor which comprises a number of blades, normally three, and a hub on which the blades are mounted. The blades are large, about 20 m to 50 m long, and their tip can reach a speed of 250 km/h.

Inside the blade, water is accumulated due to condensation. This accumulation of water in the interior of the blade is harmful in two respects: a sizeable amount of water will act as a displaceable ballast and will impair the normal functioning of the blade; and, when the blade is upright and idling, i.e., out of operation, the water will flow down the blade and may enter the hub, which houses some electric ware that can be damaged if it comes in contact with water.

Furthermore, the blades are hollow and during its manufacture, some dirt can remain inside them. Upon the rotation of the blade, this dirt eventually becomes dust and mixes with the condensation water to form some dough that is centrifuged to the tip of the blade.

It is known in the art to drill a drain bore in the tip of the blade to define a passage through which water is intended to drain off. However, when the blades rotate at high speed, any singularity or unevenness on the tip surface can produce an intense noise. Thus, this bore must be small, not more than 6 millimeters (mm) wide, in order to prevent the bore from making a big noise upon rotation. Unfortunately, the mixture of dust and water propelled to the tip by the centrifugal force is likely to obstruct such a narrow passage.

BRIEF SUMMARY OF THE INVENTION

It is an object of the present invention to provide a wind turbine blade in which condensation water inside the blade can be readily drained off.

According to the invention, there is one or more bores formed through the surface of the blade and communicating with the interior of the blade at the root area. Being formed at the root area, which is a low speed area of the blade, the bores are not easily obstructed by effect of the centrifugal force. Moreover, the bores can be of a relatively large size because, within certain limits, a singularity at the root area of the blade is not likely to produce any noticeable noise. In an embodiment, the bores are larger than 8 mm wide.

Preferably, at least one bore is located on the suction side of the blade and at least one bore is located on the pressure side of the blade. In this way, condensation water can drain off through both sides of the blade.

It may be advantageous for the blade to comprise two bores located on one or both of the suction side and the pressure side of the blade. In this case, the bores located on the same side of the blade are not on a same longitudinal line of the blade, in order to avoid reducing the strength of the blade.

In a preferred embodiment there is provided and internal strengthening structural member creating an enclosure inside the blade at the root area, with the aim of strengthening the root and closing the blade. With this disposition, it is advantageous for some bores to be located at one side of the enclosure member and for some bores to be located at the other side of the enclosure member, so that the water accumulated at both sides of the enclosure member can readily drain off.

To leave the least amount of water inside the blade, the bores are located near the enclosure member, preferably within 5 cm from the enclosure member.

Preferably, the bores have a circular shape, because a circular bore reduces the strength of the blade less than a bore having any other shape.

In an embodiment, one or more bores are provided with a protrusion protruding outwards from the outer surface of the blade, so that water flowing down the outer surface of the blade is prevented from entering the blade.

BRIEF DESCRIPTION OF THE DRAWINGS

A particular embodiment of the present invention will be described in the following, only by way of non-limiting example, with reference to the appended drawings, in which.

DETAILED DESCRIPTION OF THE INVENTION

A wind turbine comprises a hub 50 and three blades 10. Such blades have a root 13, which is the area of the blade closer to the hub and which is normally cylindrical. Beyond its root, one such blade has two flattened sides, defining for the blade a suction side and a pressure side. Thus, in the present specification, it will be understood that the root is the area of the blade between the hub and the area where the sides of the blade flatten and that both the suction side and the pressure side of the blade include the corresponding side of the root.

Inside the blade at the root area there may be an enclosure member 20 for strengthening the root and for closing the blade. The enclosure member 20 is located at a distance of 0.5 m to 3 m from the end of the root.

Figure 1:
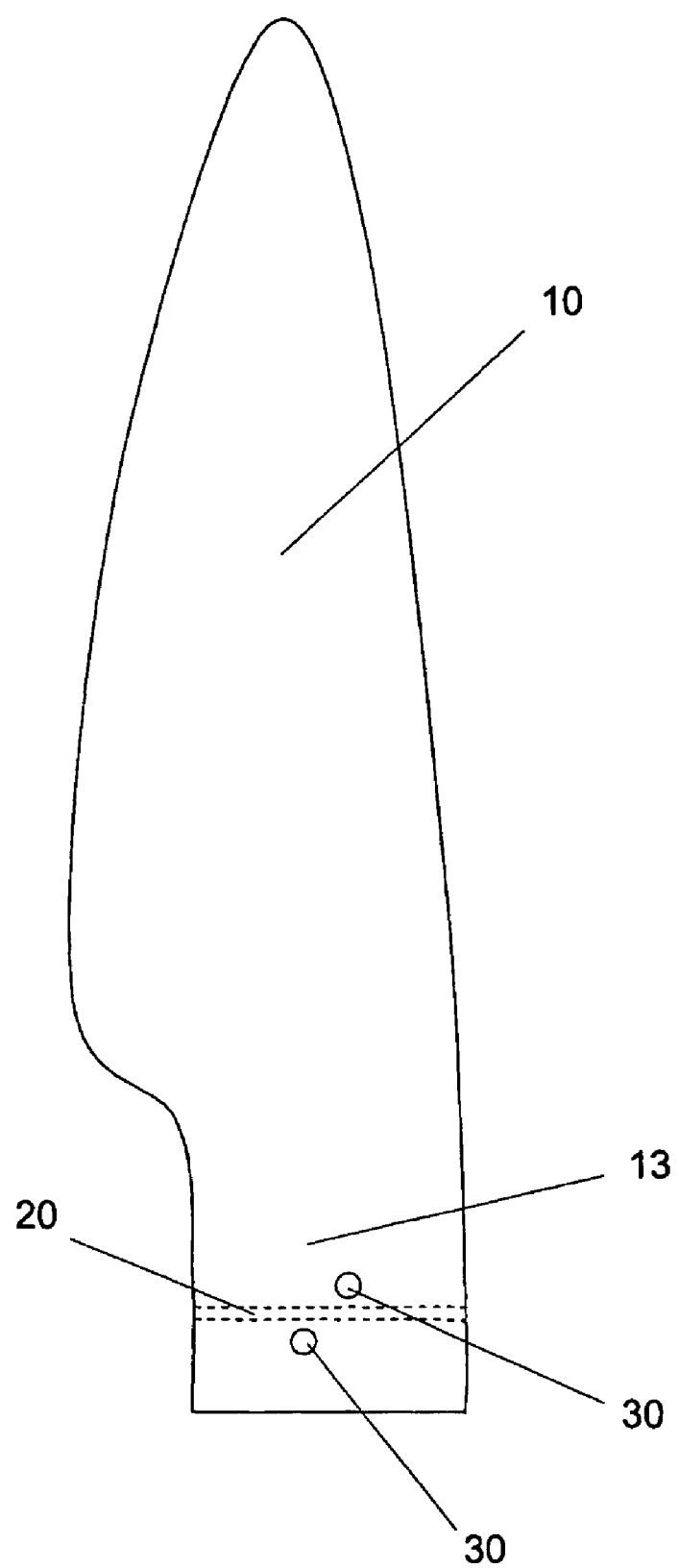
FIG. 1 is a schematic view of a blade of an embodiment of the invention.

In the embodiment of FIG. 1, there are provided four bores 30 on the blade 10 at the root 13, two at one side of the enclosure member 20 and two at the other side. As for their angular position on the surface of the root 13, two bores are located on the suction side of the blade and the other two bores are located diametrically opposite, i.e., on the pressure side of the blade.

The two neighboring bores 30 located at each side of the enclosure member 20 are at a distance of about 50 cm from each other and are offset, i.e., are not on a same longitudinal line of the blade 10, in order not to significantly reduce the strength of the longitudinal fibers of the blade.

Figure 2:
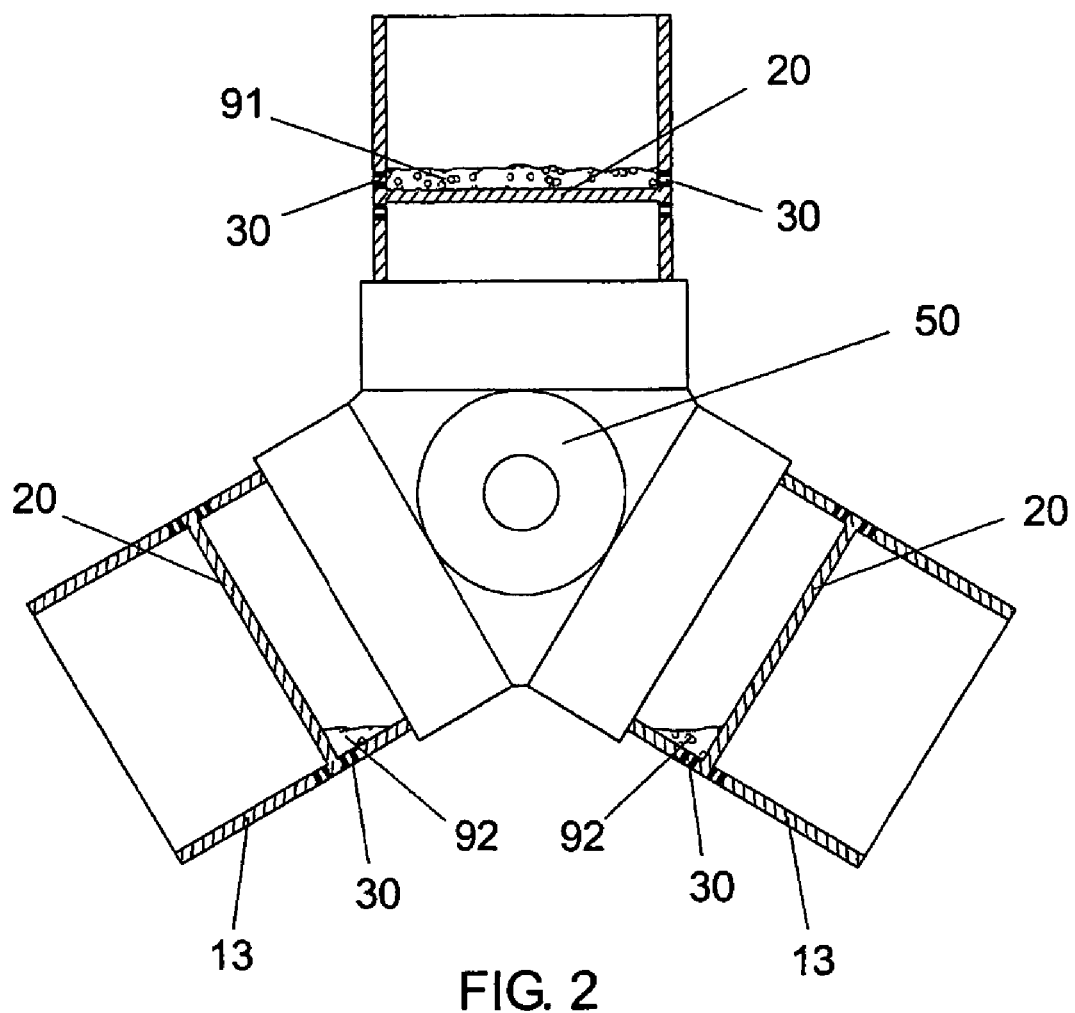
FIG. 2 is a partial sectional view of three such blades mounted on a hub.
Figure 3:
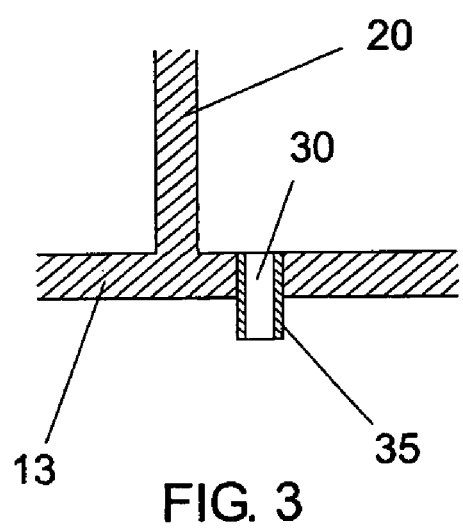
FIG. 3 is a sectional view of a portion of such a blade.

When the wind turbine is not in operation, it is in an idling condition in which the blades are oriented transversely to the wind and are almost still but not completely motionless. In the idling condition, the blades rotate at a very low speed and each blade remains upright during a fair period of time. While one of the blades 10 is idling in a substantially upright position, the condensation water existing in the blade flows down and accumulates on the enclosure member 20, see Reference 91 in FIG. 2. The water then drains off smoothly through one or two of the bores 30. While a blade is idling in a substantially downright position, the condensation water existing in the root 13 behind the enclosure 20 flows down and accumulates on the back side of the enclosure, see Reference 92 in FIG. 2. Then this water drains off through another one or other two of the bores 30. This is the reason for preferring to have some bores 30 at each side of the enclosure 20.

To be able to drain off most of the accumulated condensation water, the bores 30 are located very near the enclosure member 20, typically within 5 cm from the enclosure member 20.

Since the centrifugal forces do not push the mixture of dirt and water against the bores 30, these are not easily obstructed. Moreover, since the speed of the blade at the root is much lower than at the tip, the bores 30 can safely be up to 15 mm wide without producing much noise upon rotation, further reducing the risk of obstruction. The preferable range for the width of the bores 30 is 8 mm to 15 mm. Samples of blades made with bores within this range have proven to effectively remove moisture from within the blade.

The bores 30 are preferably of circular shape because the root 13 is the most strained area of the blade and a circular bore develops less stress than a bore having any other shape.

In an embodiment, each bore 30 is provided on the outer surface of the blade with an open protrusion 35. The protrusions 35 do not produce extra noise upon rotation because they are located on a low speed area of the blade. The protrusions 35 prevent the water that condensates on the outer surface of the blade 10 from reaching the corresponding bores 30 and thus getting into the blade.

In an alternative embodiment there is no enclosure member 20. In this case, it is preferred to provide the bores 30 within a distance of 5 cm from the end of the root 13, the features not directly related to the enclosure 20 member being as explained above.

Although only particular embodiments of the invention have been shown and described in the present specification, the skilled man will be able to introduce modifications and substitute any technical features thereof with others that are technically equivalent, depending on the particular requirements of each case, without departing from the scope of protection defined by the appended claims.

It is clear, for instance, that there can be any number of bores 30 on the blade 10 at the root area 13, or that the bores 30 can be located at only one side of the enclosure 20 member.

What is claimed as new and desired to be protected by Letters Patent of the United States is:

1. A wind turbine blade which comprises: a blade body extending from a blade root area to a blade tip and defining a blade cavity, said blade body adapted for use in a wind turbine and adapted to connect to a wind turbine rotor hub at said root area, said blade body including a blade surface comprising a suction side and a pressure side; and a drain for draining off water that condenses inside said blade cavity, wherein said drain comprises at least one hole formed on said surface of said wind turbine blade and communicating with said blade cavity, said at least one hole being located at said wind turbine blade root area.

2. A wind turbine blade according to claim 1 wherein there are two of said holes, at least one hole being located on said suction side of the blade, and at least one hole being located on said pressure side of the blade.

3. A wind turbine blade according to claim 2 wherein said drain holes are both located at said root area.

4. A wind turbine blade according to claim 3 wherein there are two of said holes located on the same side of the blade but not on a same longitudinal line of the blade.

5. A wind turbine blade according to claim 1 wherein there is provided an enclosure member inside the blade at the root area; said enclosure member extending from the inside surface of the suction side of the blade to the inside surface of the pressure side of the blade to provide structural strength.

6. A wind turbine blade according to claim 5 wherein said enclosure member separates the interior of said blade into two compartments, one nearer the root and one nearer the tip, and said drain comprises at least one hole located at one side of said enclosure member and at least one hole located at the other side of said enclosure member.

7. A wind turbine blade according to claim 6 wherein at least one of said holes is located within 5 cm from said enclosure member.

8. A wind turbine blade according to claim 1 wherein said at least one hole has a circular shape.

9. A wind turbine blade according to claim 8 wherein the diameter of said at least one hole is greater than 8 mm.

10. A wind turbine blade according to claim 1 wherein at least one hole is provided with a protrusion protruding outwards from the outer surface of the blade.

11. A wind turbine blade according to claim 1 wherein said at least one hole is from 8 mm to 15 mm in width.

12. A method of draining the interior of a wind turbine blade, said method comprising: providing a wind turbine blade having a root area adapted for being connected to a wind turbine rotor hub; forming a drain communicating with the interior of said blade in the region of said root of said blade; and draining water from said blade through said drain while said blade is operating slowly in an idling condition.

13. A method as in claim 12 wherein said drain includes an internal structural enclosure member in said root area, said enclosure member separating the interior of said blade into a first region at said root and a second region nearer said tip, and said forming comprises forming a first drain communicating with the interior of said blade in said first region on one side of said enclosure member and forming a second drain communicating with the interior of said blade in said second region on the other side of said enclosure member.

14. A method as in claim 12 wherein said forming said drain further comprises forming a hole communicating with the interior of said blade and forming a protrusion communicating with said hole, and said method comprising using said protrusion to prevent water on the exterior of said blade from entering the interior of said blade via said hole.

15. A wind turbine comprising a rotor hub and three wind turbine blades attached to said rotor hub, each of said wind turbine blades including at least two drain holes, both of said drain holes in each of said blades located at the root area of said blade.

* * * * *